(12) United States Patent
Chen et al.

(10) Patent No.: US 7,639,507 B2
(45) Date of Patent: Dec. 29, 2009

(54) CONTROL DEVICE USED FOR A COMPUTER CASING ON WHICH A PLURALITY OF EXPANSION CARDS IS INSERTED

(75) Inventors: Richard Chen, San Jose, CA (US); Alan Lee, Fremont, CA (US)

(73) Assignee: Super Micro Computer, Inc, San Jose, CA (US)

( * ) Notice: Subject to any disclaimer, the term of this patent is extended or adjusted under 35 U.S.C. 154(b) by 284 days.

(21) Appl. No.: 11/790,087

(22) Filed: Apr. 23, 2007

(65) Prior Publication Data

US 2008/0259579 A1 Oct. 23, 2008

(51) Int. Cl.
*H05K 5/00* (2006.01)
(52) U.S. Cl. .................. 361/756; 361/727; 361/752
(58) Field of Classification Search ............ 361/727, 361/756, 737, 752, 790, 797, 800, 807, 810, 361/600, 679
See application file for complete search history.

(56) References Cited

U.S. PATENT DOCUMENTS

| | | | |
|---|---|---|---|
| 6,055,152 A * | 4/2000 | Felcman et al. | 361/679.39 |
| 6,216,184 B1 * | 4/2001 | Fackenthall et al. | 710/301 |
| 6,273,730 B1 * | 8/2001 | Chang | 439/61 |
| 6,404,624 B1 * | 6/2002 | Jeong | 361/679.41 |
| 6,538,903 B1 * | 3/2003 | Radu et al. | 361/818 |
| 7,499,289 B2 * | 3/2009 | Liang | 361/796 |
| 2004/0240173 A1 * | 12/2004 | Yi et al. | 361/686 |
| 2009/0073645 A1 * | 3/2009 | Tsai et al. | 361/679.6 |

* cited by examiner

*Primary Examiner*—Hung S Bui
(74) *Attorney, Agent, or Firm*—Jackson IPG PLLC

(57) ABSTRACT

A control device used for a computer casing on which a plurality of expansion cards is inserted, is composed of a first frame and a second frame which are installed in a casing of height of 2 U; a connection element, which is connected on the first and second frames, and is in a vertical state; a right riser card, which is connected on a right side of the connection element; a left riser card, which is connected on a left side of the connection element; a plurality of expansion cards, which is inserted horizontally into a plurality of slots of the right riser card; and a plurality of expansion cards, which is inserted horizontally into a plurality of slots of the left riser card. By this control device, at least more than seven expansion cards or interface cards can be inserted.

5 Claims, 5 Drawing Sheets

CONTROL DEVICE USED FOR A COMPUTER CASING ON WHICH A PLURALITY OF EXPANSION CARDS IS INSERTED

BACKGROUND OF THE INVENTION a) Field of the Invention

The present invention relates to a control device used for a computer casing on which a plurality of expansion cards is inserted, and more particularly to a control device wherein a connection element is installed in a casing of height of 2 U (1 U is equal to 1.75 in), and left and right sides of the connection elements are connected and fixed respectively with a right riser card and a left riser card, such that at least more than seven expansion cards can be inserted by a plurality of adaptive slots which is welded on the vertically positioned left and right riser cards, respectively.

b) Description of the Prior Art

It is known that in a conventional computer casing of height of 2 U, expansion cards (or interface cards) are all vertically inserted into adaptive slots of a circuit motherboard. As area of the motherboard is limited, only three or four expansion cards can be inserted vertically in nowadays. As more and more functions of industrial or commercial computers are required, the number of required expansion cards (i.e., interface cards) is also increased correspondingly. Therefore, how to install at least more than seven expansion cards (interface cards) in a standard casing of height of 2 U, to increase its functions of usage, is a technical issue to be pursued by the present invention.

SUMMARY OF THE INVENTION

The primary object of present invention is to provide a control device used for a computer casing on which a plurality of expansion cards is inserted, wherein a vertical connection element is installed in a computer casing of height of 2 U, two sides of the connection element are screwed and fixed respectively with a vertical right riser card and a left riser card, and the left and right riser cards are welded with a plurality of adaptive slots for providing an insertion of at least more than seven expansion cards or interface cards.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
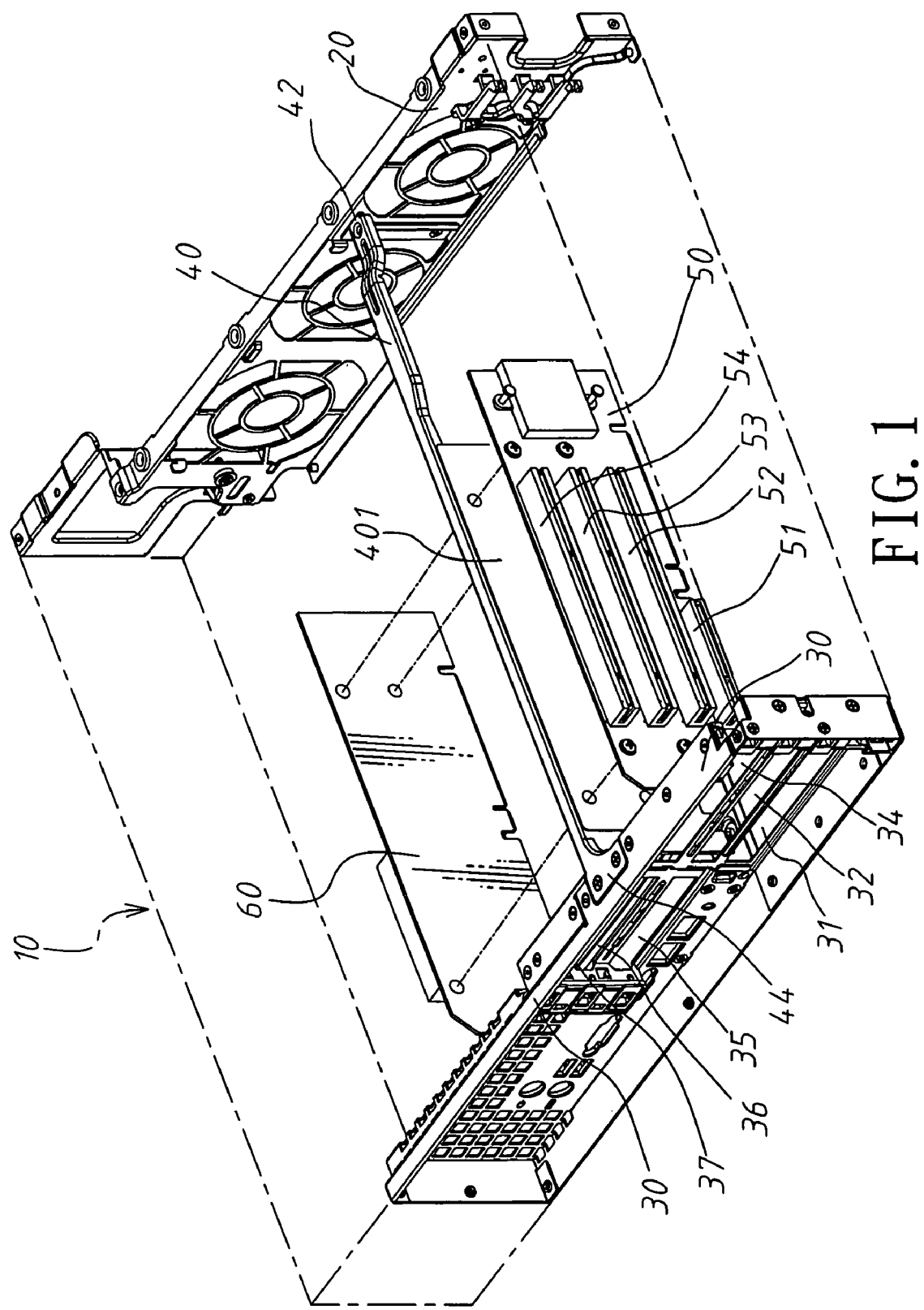
FIG. 1 shows an exploded view of local parts of the present invention.

Referring to FIG. 1, the present invention is to provide a control device used for a computer casing on which a plurality of expansion cards is inserted, including a first frame 20 and a second frame 30 which are installed in a casing 10 (as shown by imaginary lines) of height of 2 U; a connection element 40, a connection end 42 of which is connected on the first frame 20, the other connection end 44 of which is connected on the second frame 30, and which is in a vertical state; a right riser card 50, a board surface of which is welded with a plurality of slots 51, 52, 53, 54, and which is connected on a right side of the connection element 40; and a left riser card 60, a board surface of which is welded with a plurality of slots 61, 62, 63, and which is connected on a left side of the connection member 40.

Figure 2:
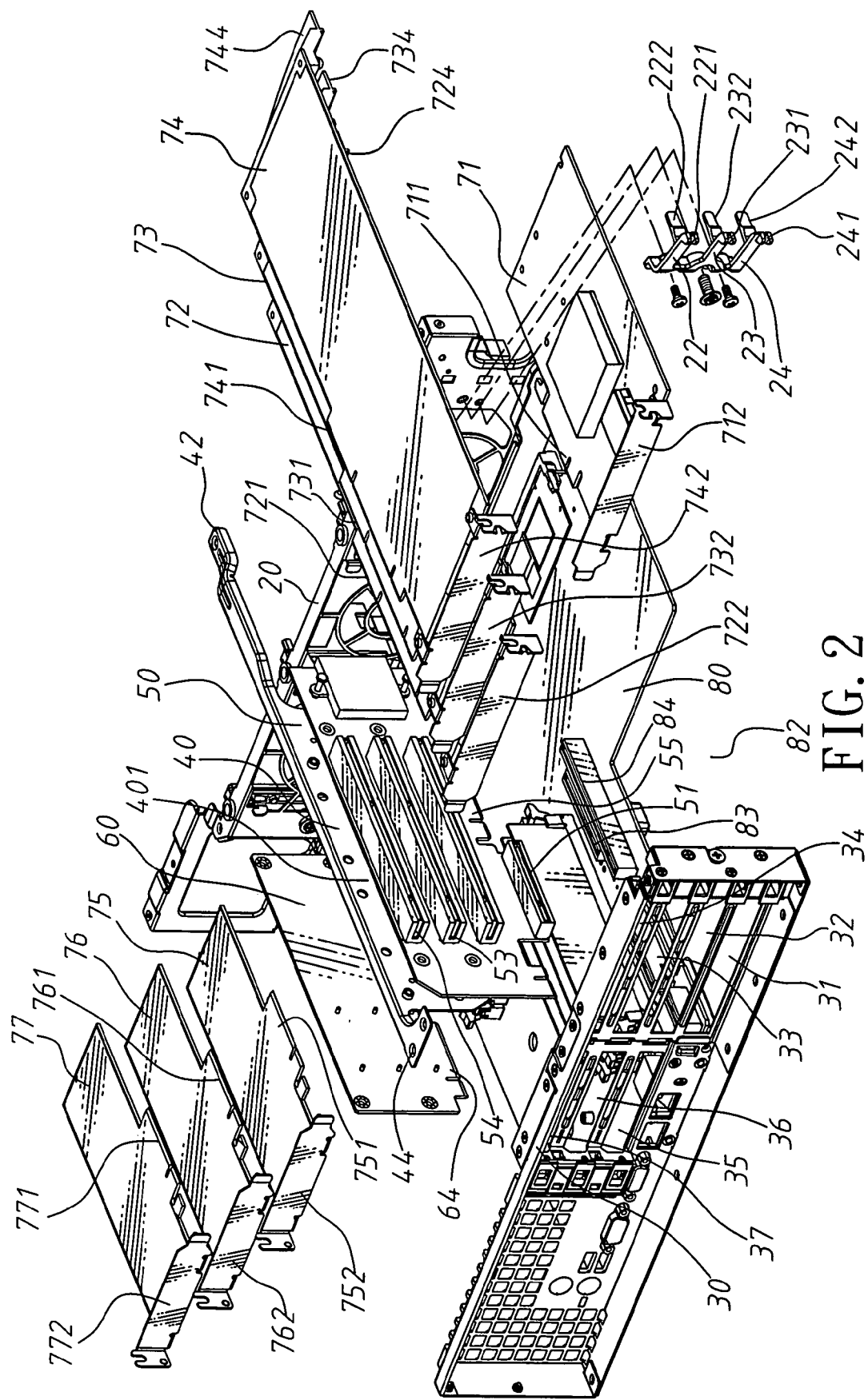
FIG. 2 shows another exploded view of local parts of the present invention.
Figure 3:
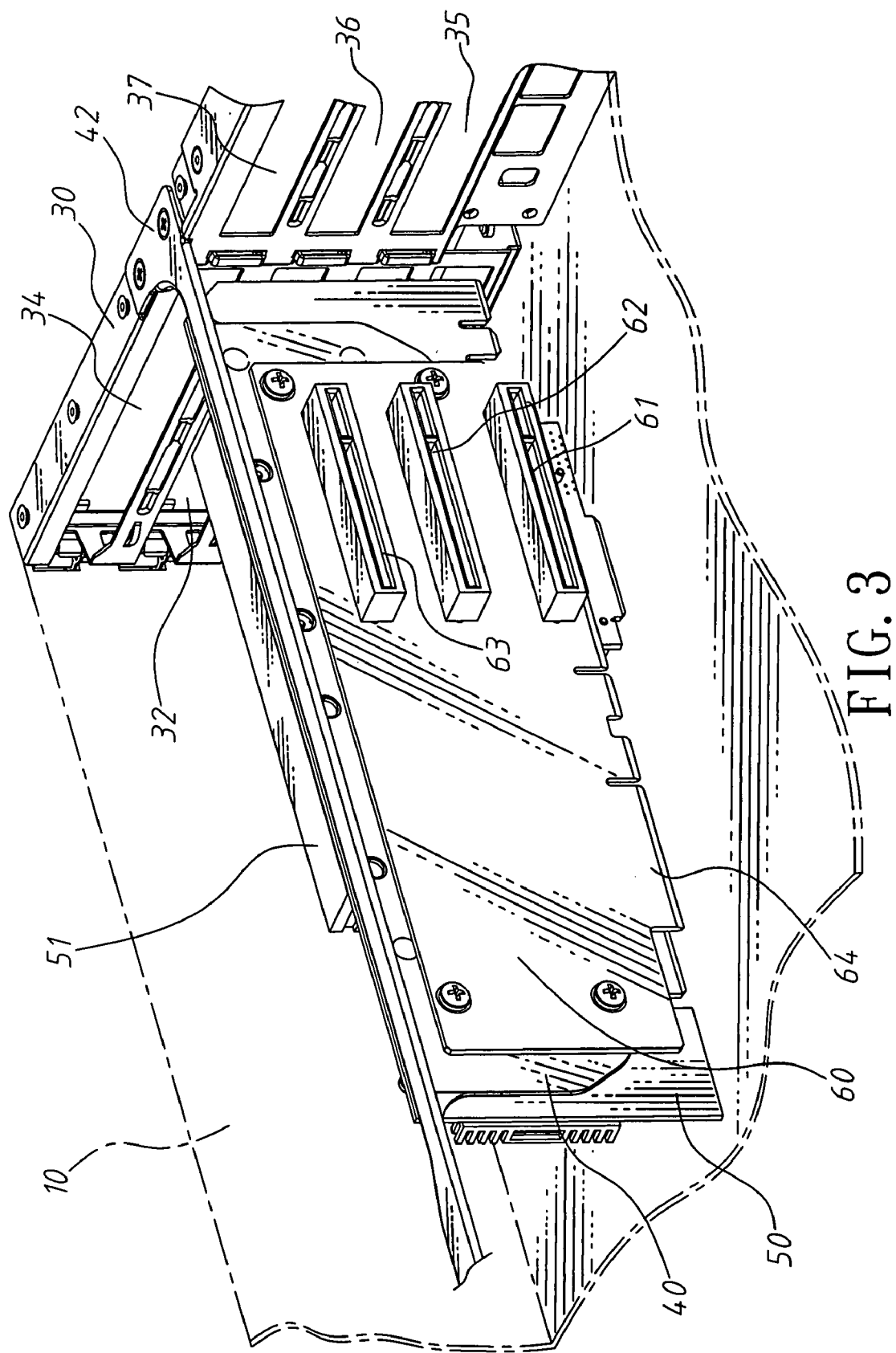
FIG. 3 shows a local perspective view of the present invention.

Referring to FIG. 2, a set of plural expansion cards 71, 72, 73, 74 is inserted horizontally into the plural slots 51, 52, 53, 54 of the right riser card 50. Referring to FIG. 2 and FIG. 3, a set of plural expansion cards 75, 76, 77 is inserted horizontally into the plural slots 61, 62, 63 of the left riser card 60.

Referring to FIG. 2, a bottom surface of the casing 10 is fixedly connected with a circuit motherboard 80 on which is welded with a left slot 83 and a right slot 84 which are next to each other. A conduction pin 64 of the left riser card 60 is inserted into the left slot 83; whereas, a conduction pin 55 of the right riser card 50 is inserted into the right slot 84, to achieve electrical connection.

The plural slots of the right riser card 50 are defined respectively as a first slot 51, a second slot 52, a third slot 53, and a fourth slot 54. The plural expansion cards that are inserted into the first, second, third, and fourth slots 51, 52, 53, 54, of the right riser card 50, are defined respectively as a first expansion card 71, a second expansion card 72, a third expansion card 73, and a fourth expansion card 74. A conduction pin 711 of the first expansion card 71 is inserted into the first slot 51, a conduction pin 721 of the second expansion card 72 is inserted into the second slot 52, a conduction pin 731 of the third expansion card 73 is inserted into the third slot 53, and a conduction pin 741 of the fourth expansion card 74 is inserted into the fourth slot 54. The first, second, third, and fourth expansion cards 71, 72, 73, 74, are parallel to one another and are in a horizontal state.

Referring to FIG. 2 and FIG. 3, the plural slots that are welded on the left riser card 60 are defined respectively as a first slot 61, a second slot 62, and a third slot 63. The plural expansion cards that are inserted into the first, second, and third slots 61, 62, 63, of the left riser card 60, are defined respectively as a fifth expansion card 75, a sixth expansion card 76, and a seventh expansion card 77. A conduction pin 751 of the fifth expansion card 75 is inserted into the first slot 61, a conduction pin 761 of the sixth expansion card 76 is inserted into the second slot 62, and a conduction pin 771 of the seventh expansion card 77 is inserted into the third slot 63. The fifth, sixth, and seventh expansion cards 75, 76, 77, are parallel to one another and are in a horizontal state.

Figure 5:
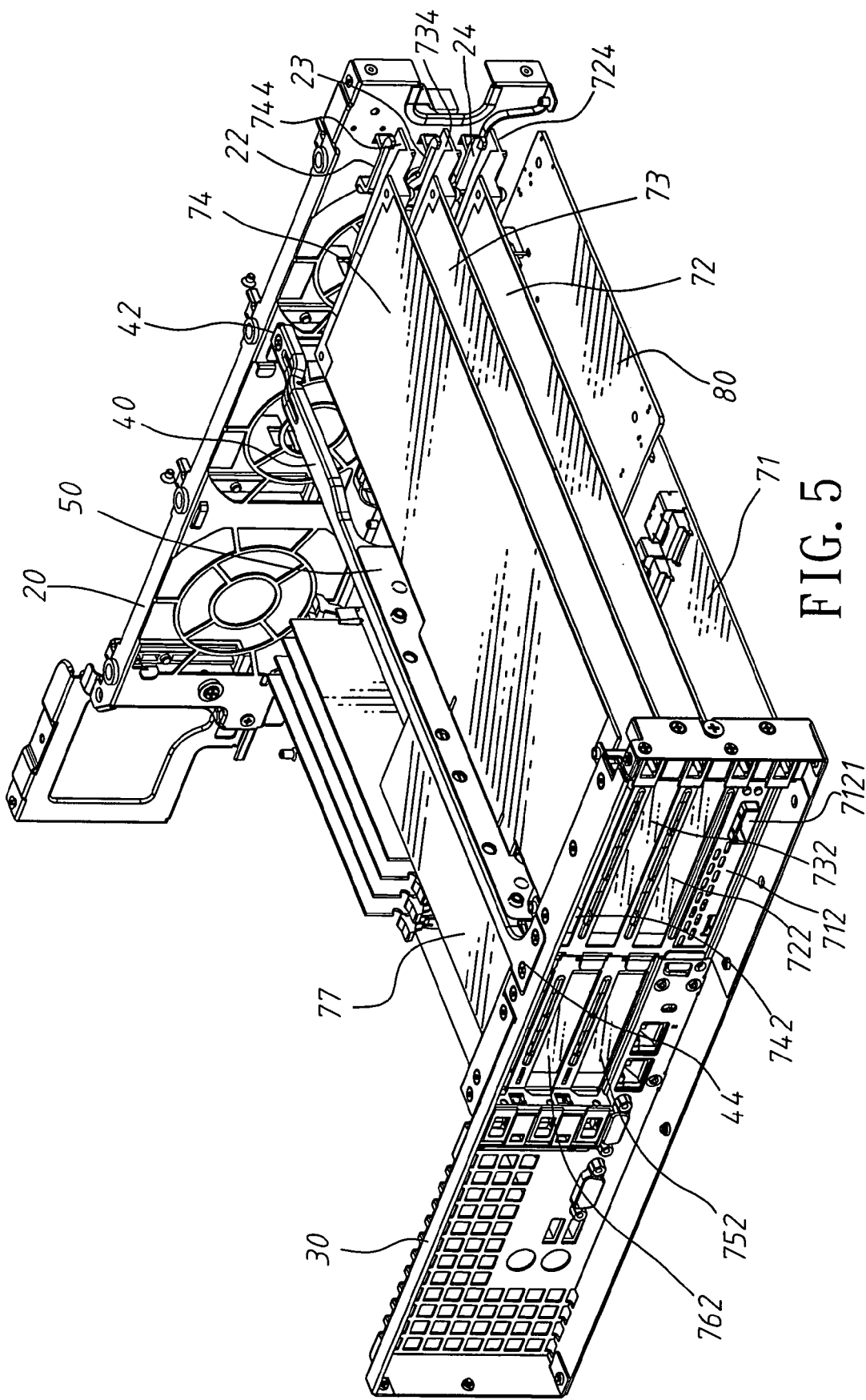
FIG. 5 shows a perspective view of local parts in FIG. 2, after being assembled.

Referring to FIG. 2, the second frame 30 is an I/O board of the computer casing 10, and is provided with seven long through-holes which are defined respectively as a first long through-hole 31, a second long through-hole 32, a third long through-hole 33, a fourth long through-hole 34, a fifth long through-hole 35, a sixth long through-hole 36, and a seventh long through-hole 37. Referring to FIG. 2 and FIG. 5, a front end of the first expansion card 71 is fixedly connected with a metallic piece 712 which is connected at a rim of the first long through-hole 31, a front end of the second expansion card 72 is fixedly connected with a metallic piece 722 which is connected at a rim of the second long through-hole 32, a front end of the third expansion card 73 is fixedly connected with a metallic piece 732 which is connected at a rim of the third long through-hole 33, a front end of the fourth expansion card 74 is fixedly connected with a metallic piece 742 which is connected at a rim of the fourth long through-hole 34, a front end of the fifth expansion card 75 is fixedly connected with a metallic piece 752 which is connected at a rim of the fifth long through-hole 35, a front end of the sixth expansion card 76 is fixedly connected with a metallic piece 762 which is connected at a rim of the sixth long through-hole 36, and a front end of the seventh expansion card 77 is fixedly connected with a metallic piece 772 which is connected at a rim of the seventh long through-hole 37.

Figure 4:
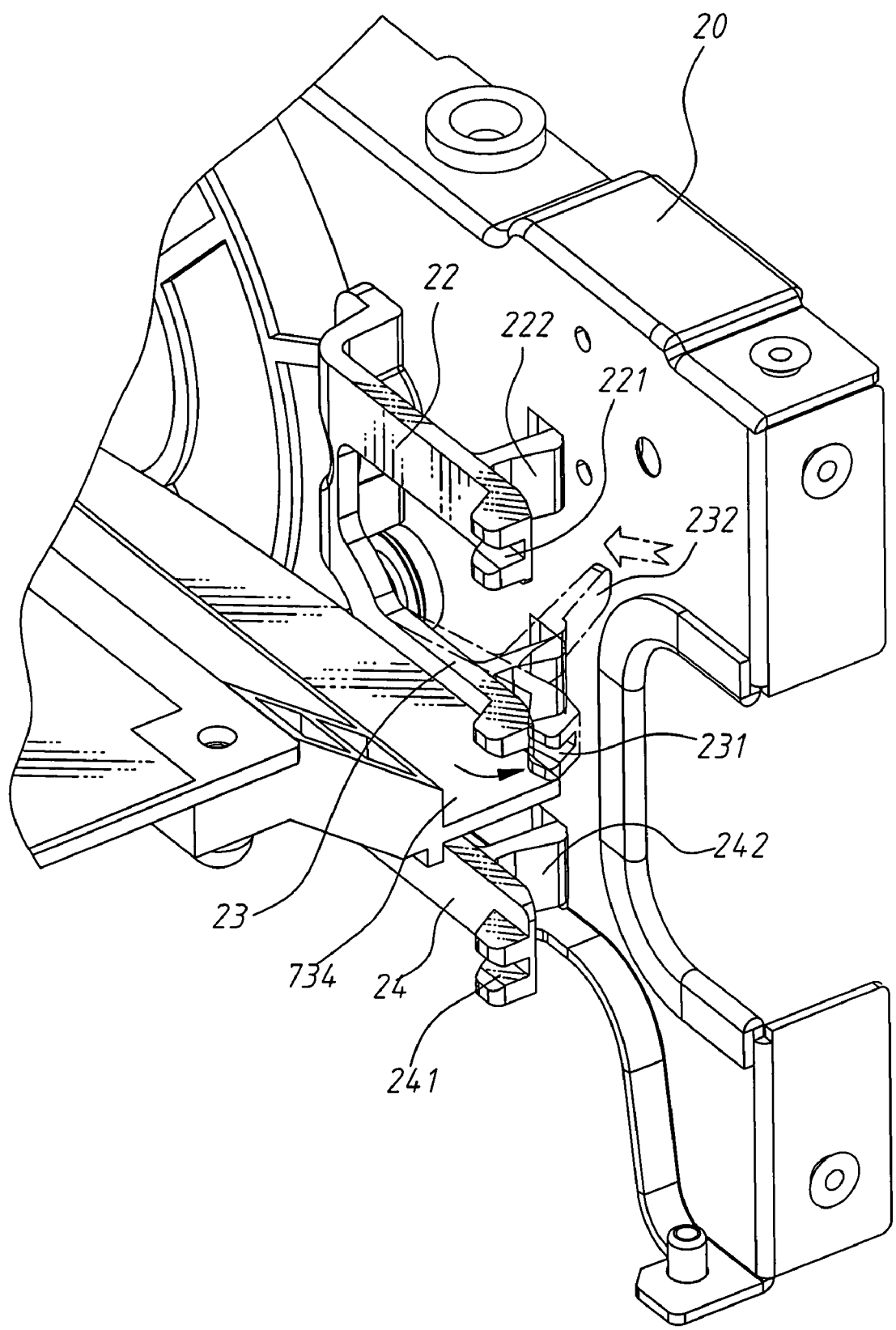
FIG. 4 shows a local perspective view of a first frame of the present invention.

Referring to FIG. 2 and FIG. 4, an inner board of the first frame 20 is fixed respectively with a first hook 24, a second hook 23, and a third hook 22; end parts of the first, second, and third hooks 24, 23, 22, are provided respectively with locking slots 241, 231, 221. Rear ends of the first, second, and third hooks 24, 23, 22 are integrally extended with projection pieces 242, 232, 222, for pressing by a human hand. Rear ends of the second, third, and fourth expansion cards 72, 73, 74 are connected respectively with a first, second, and third locking pieces 724, 734, 744 (as shown in FIG. 2); the first locking piece 724 is locked into the locking slot 241 of the first hook 24, the second locking piece 734 is locked into the locking slot 231 of the second hook 23, and the third locking piece 744 is inserted into the locking slot 221 of the third hook 22.

Referring to FIG. 1, a first frame 20 is transversally crossed over and connected in an internal space of a computer casing 10 of height of 2 U. A second frame 30 is an I/O connection interface and is located at a front or a rear side of the computer casing 10. The computer casing 10 of standard height of 2 U is a standardized product, and in the present invention, a vertical connection element 40 is installed between the first and second frames 20, 30. A central part of the connection element 40 is a board 401 (as shown in FIG. 2), which is used to screw with a right riser card 50 and a left riser card 60. A first, second, third, and fourth slots 51, 52, 53, 54 of the right riser card 50 are further made to be parallel to one another and to be located at a space above a circuit motherboard 80. In addition, a first, second, and third slots 61, 62, and 63 of the vertical left riser card 60, are also parallel to one another and located at a space above the circuit motherboard 80. This design of plural slots enables a first, second, third and fourth expansion cards 71, 72, 73, 74 to be inserted respectively into the first, second, third, and fourth slots 51, 52, 53, 54 of the right riser card 50, as well as enables a fifth, sixth, and seventh expansion cards 75, 76, 77 to be inserted respectively into the first, second, and third slots 61, 62, 63 of the left riser card 60. The first, second, third, and fourth expansion cards 71, 72, 73, 74 are further made to be parallel to one another and to be located at a space above a surface of the circuit motherboard 80 (as shown in FIG. 5), wherein the first expansion card 71 can be located in an L-shape notch 82 at a front corner of the circuit motherboard 80, allowing the first expansion card 71 to be at a same height as or a little higher than a surface of the circuit motherboard 80.

The fifth, sixth, and seventh expansion cards 75, 76, 77 are PCI (Peripheral Component Interconnect) short cards, which are inserted horizontally into the first, second, and third slots 61, 62, 63 of the left riser card 60, respectively. The fifth, sixth, and seventh expansion cards 75, 76, 77 are parallel to one another and are overlapped on the space above the surface of the circuit motherboard 80, thereby achieving an extraordinary function, which is that by using the space above the circuit motherboard 80, the first to seventh expansion cards 71~77 can be cleverly overlapped and positioned in a horizontal direction, such that the internal space of the computer casing 10 of height of 2 U can be utilized sufficiently to fix more expansion cards, so as to improve function of usage of a computer host (or server).

Referring to FIG. 2 and FIG. 5, a plurality of metallic pieces 712, 722, 732, 742, 752, 762, 772 is a conventional cover piece having an L-shape cross section, and is pivoted respectively at a first, second, third, fourth, fifth, sixth, and seventh long through-holes 31, 32, 33, 34, 35, 36, 37.

A main body of the plural metallic pieces 712, 722, 732, 742, 752, 762, 772, can be designed as a long strip of through-hole, or all kinds of connector and socket. Referring to FIG. 5, the metallic piece 712 can be provided with a connection socket 7121 for an insertion of an external connector.

Furthermore, the first to seventh expansion cards 71~77 can have different lengths; for example, a PCI expansion card of full length of about 312 mm and full height of about 106.88 mm can be chosen, or a shorter expansion card can be selected. If the expansion card is a full length, full height specification, then the second, third, and fourth expansion cards 72, 73, 74 as shown in FIG. 2 are the full length, full height cards, with their tail ends being fixed with a first, second, and third locking pieces 724, 734, 744 which are locked respectively into locking slots 241, 231, 221, further enabling the second, third, and fourth expansion cards 72, 73, 74 to be stably positioned.

Accordingly, at least more than seven expansion cards (interface cards) can be installed in the internal space of the computer casing 10 of height of 2 U, which enables the space above the circuit motherboard 80 to be utilized sufficiently, such that expansion cards (interface cards) of more functions can be installed, thereby improving the function of usage of the computer host (or server).

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A control device used for a computer casing on which a plurality of expansion cards is inserted:

a first frame and a second frame which are installed in a casing of height of 2 U; a connection element, a connection end of which is connected on the first frame, the other connection end of which is connected on the second frame, and which is in a vertical state;

a right riser card, a board of which is welded with a plurality of slots, and which is connected on a right side of the connection element; a left riser card, a board of which is welded with a plurality of slots, and which is connected on a left side of the connection element;

a set of plural expansion cards which is inserted horizontally into the plural slots of the right riser card; and a set of plural expansion cards which is inserted horizontally into the plural slots of the left riser card, wherein an inner board of the first frame is fixed respectively with a first hook, a second hook, and a third hook, with end parts of the first, second, and third hooks being provided respectively with locking slots; rear ends of the first, second, and third hooks being integrally extended with projection pieces for pressing by a human hand; rear ends of the second, third, and fourth expansion cards being connected respectively with a first, second, and third locking pieces; the first locking piece being locked into the locking slot of the first hook, the second locking piece being locked into the locking slot of the second hook, and the third locking piece being locked into the locking slot of the third hook.

2. The control device used for a computer casing on which a plurality of expansion cards is inserted, according to claim 1, wherein a bottom surface of the casing is fixedly connected with a circuit motherboard on which is welded with a left slot and a right slot that are next to each other; a conduction pin of the left riser card being inserted into the left slot, and a conduction pin of the right riser card being inserted into the right slot, to achieve electrical connection.

3. The control device used for a computer casing on which a plurality of expansion cards is inserted, according to claim 1, wherein the plural slots of the right riser card are defined respectively as a first slot, a second slot, a third slot, and a fourth slot; the plural expansion card that are inserted into the first, second, third, and fourth slots of the right riser card being defined respectively as a first expansion card, a second expansion card, a third expansion card, and a fourth expansion card; a conduction pin of the first expansion card being inserted into the first slot, a conduction pin of the second expansion card being inserted into the second slot, a conduction pin of the third expansion card being inserted into the third slot, and a conduction pin of the fourth expansion card being inserted into the fourth slot; the first, second, third, and fourth expansion cards being parallel to one another and being in a horizontal state.

4. The control device used for a computer casing on which a plurality of expansion cards is inserted, according to claim 1, wherein the plural slots that are welded on the left riser card are defined respectively as a first slot, a second slot, and a third slot; the plural expansion cards that are inserted into the first, second, and third slots of the left riser card being defined respectively as a fifth expansion card, a sixth expansion card, and a seventh expansion card; a conduction pin of the fifth expansion card being inserted into the first slot, a conduction pin of the sixth expansion card being inserted into the second slot, and a conduction pin of the seventh expansion card being inserted into the third slot; the fifth, sixth, and seventh expansion cards being parallel to one another and being in a horizontal state.

5. The control device used for a computer casing on which a plurality of expansion cards is inserted, according to claim 1, wherein the second frame is an I/O board of the computer casing and is provided with seven long through-holes which are defined respectively as a first long through-hole, a second long through-hole, a third long through-hole, a fourth long through-hole, a fifth long through-hole, a sixth long through-hole, and a seventh long through-hole; a front end of the first expansion card being fixedly connected with a metallic piece which is connected at a rim of the first long through-hole, a front end of the second expansion card being fixedly connected with a metallic piece which is connected at a rim of the second long through-hole, a front end of the third expansion card being fixedly connected with a metallic piece which is connected at a rim of the third long through-hole, a front end of the fourth expansion card being fixedly connected with a metallic-piece which is connected at a rim of the fourth long through-hole, a front end of the fifth expansion card being fixedly connected with a metallic piece which is connected at a rim of the fifth long through-hole, a front end of the sixth expansion card being fixedly connected with a metallic piece which is connected at a rim of the sixth long through-hole, and a front end of the seventh expansion card being fixedly connected with a metallic piece which is connected at a rim of the seventh long through-hole.

* * * * *